(12) United States Patent
Sui et al.

(10) Patent No.: US 11,188,088 B2
(45) Date of Patent: Nov. 30, 2021

(54) HUMAN INTERACTING AUTOMATIC GUIDED VEHICLE

(71) Applicant: LINGDONG TECHNOLOGY (BEIJING) CO. LTD, Beijing (CN)

(72) Inventors: Liang Sui, Beijing (CN); Chiung Lin Chen, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 587 days.

(21) Appl. No.: 16/096,409

(22) PCT Filed: Oct. 10, 2018

(86) PCT No.: PCT/CN2018/109649
§ 371 (c)(1),
(2) Date: Oct. 25, 2018

(87) PCT Pub. No.: WO2020/073232
PCT Pub. Date: Apr. 16, 2020

(65) Prior Publication Data
US 2021/0232148 A1 Jul. 29, 2021

(51) Int. Cl.
*G05D 1/02* (2020.01)
*B60W 50/14* (2020.01)
(Continued)

(52) U.S. Cl.
CPC ........... *G05D 1/0231* (2013.01); *B60W 50/14* (2013.01); *G05D 1/0011* (2013.01);
(Continued)

(58) Field of Classification Search
CPC .. G05D 1/0231; G05D 1/0011; G05D 1/0212; G05D 1/0287; G05D 2201/0216;
(Continued)

(56) References Cited

U.S. PATENT DOCUMENTS 9,623,561 B2 * 4/2017 Stephens, Jr. .......... B25J 9/1689
9,878,445 B2 * 1/2018 Angle ..................... B25J 11/008
(Continued)

FOREIGN PATENT DOCUMENTS

| CN | 102393739 A | 3/2012 |
|---|---|---|
| CN | 106741028 A | 5/2017 |

(Continued)

OTHER PUBLICATIONS

International search report of the International Application No. PCT/CN2018/109649 dated Feb. 3, 2019.

*Primary Examiner* — Hussein Elchanti
(74) *Attorney, Agent, or Firm* — NZ Carr Law Office PLLC

(57) ABSTRACT

Embodiments of the present disclosure relate to automatic guide vehicles (AGVs) that are capable of interacting with human operators. Particularly, the AGVs can follow a human operator, lead a human operator, and receive and react to gestures from a human operator. The AGVs switches directions of moving to provide human operators with easy access to components of user interface on the AGVs. The AGVs are also capable of avoiding collision with other AGVs by yielding to AGVs with a higher priority level.

12 Claims, 12 Drawing Sheets

(51) Int. Cl.
  *G05D 1/00* (2006.01)
  *G06K 9/00* (2006.01)
  *G06F 3/0484* (2013.01)
  *G06F 3/0488* (2013.01)

(52) U.S. Cl.
  CPC ......... *G05D 1/0212* (2013.01); *G05D 1/0287* (2013.01); *G06K 9/00335* (2013.01); *G05D 2201/0216* (2013.01); *G06F 3/0484* (2013.01); *G06F 3/0488* (2013.01)

(58) Field of Classification Search
  CPC .. B60W 50/14; G06K 9/00335; G06F 3/0484; G06F 3/0488
  See application file for complete search history.

(56) References Cited

U.S. PATENT DOCUMENTS

| | | | |
|---|---|---|---|
| 2008/0312772 A1* | 12/2008 | Hasegawa | G06N 3/008 700/260 |
| 2012/0029697 A1 | 2/2012 | Ota et al. | |
| 2012/0316680 A1* | 12/2012 | Olivier, III | G05D 1/0246 700/258 |
| 2015/0094879 A1* | 4/2015 | Pari | B25J 5/007 701/2 |
| 2015/0190925 A1* | 7/2015 | Hoffman | B25J 9/1671 700/257 |
| 2015/0229906 A1* | 8/2015 | Inacio De Matos | G01S 3/7864 348/46 |
| 2018/0299882 A1* | 10/2018 | Kichkaylo | G05B 19/41895 |
| 2019/0102891 A1* | 4/2019 | Xie | G06T 7/74 |
| 2019/0375094 A1* | 12/2019 | Kim | G05D 1/0238 |
| 2020/0064827 A1* | 2/2020 | Miller | G06F 3/017 |
| 2020/0108851 A1* | 4/2020 | Hagen | B62B 3/1464 |

FOREIGN PATENT DOCUMENTS

| | | |
|---|---|---|
| CN | 107807652 A | 3/2018 |
| CN | 207374107 U | 5/2018 |
| CN | 108408346 A | 8/2018 |
| CN | 108549386 A | 9/2018 |
| EP | 2385435 A1 | 9/2011 |
| EP | 3216745 A1 | 9/2017 |
| JP | 0564906 A | 3/1993 |

* cited by examiner

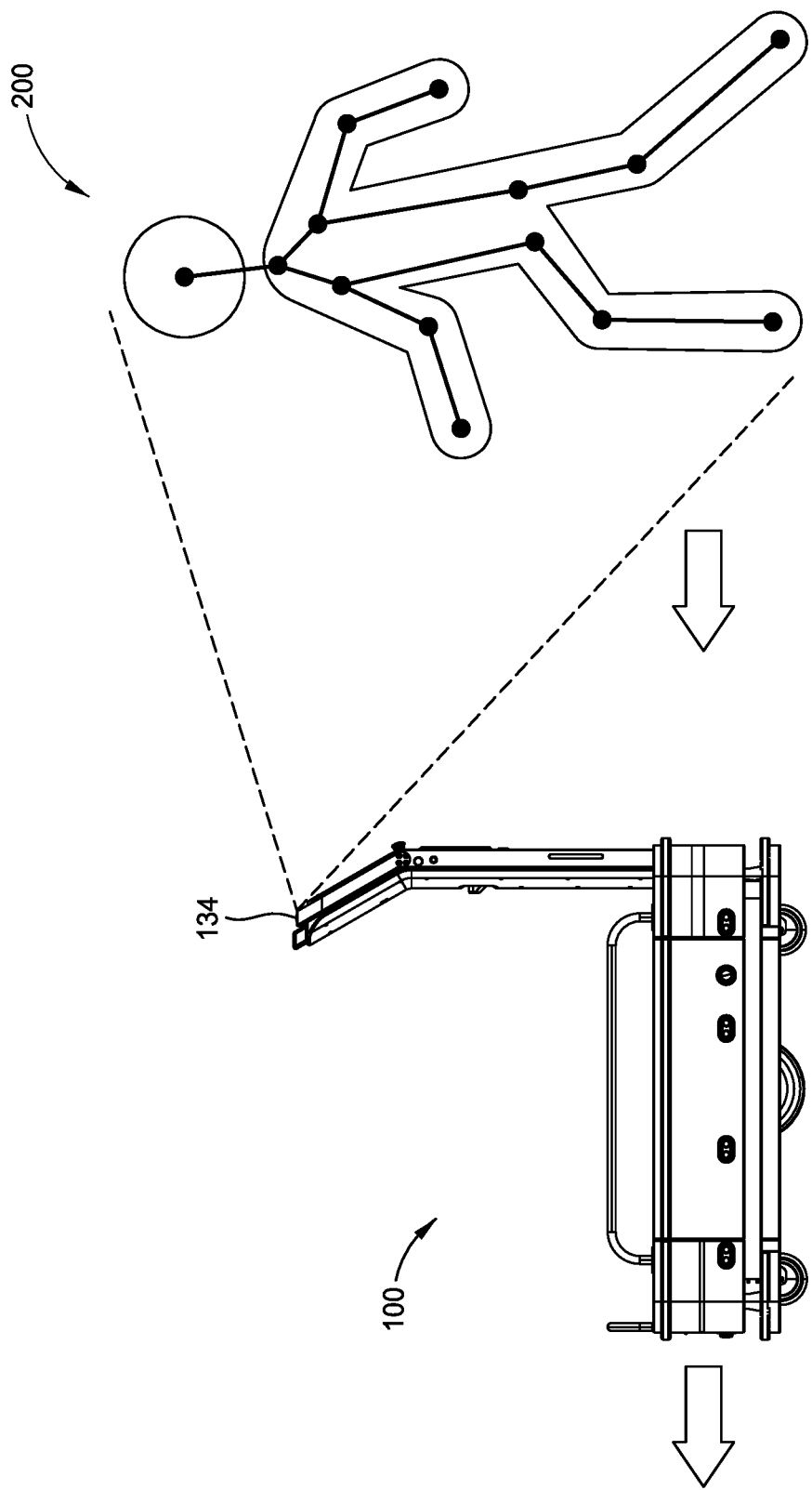

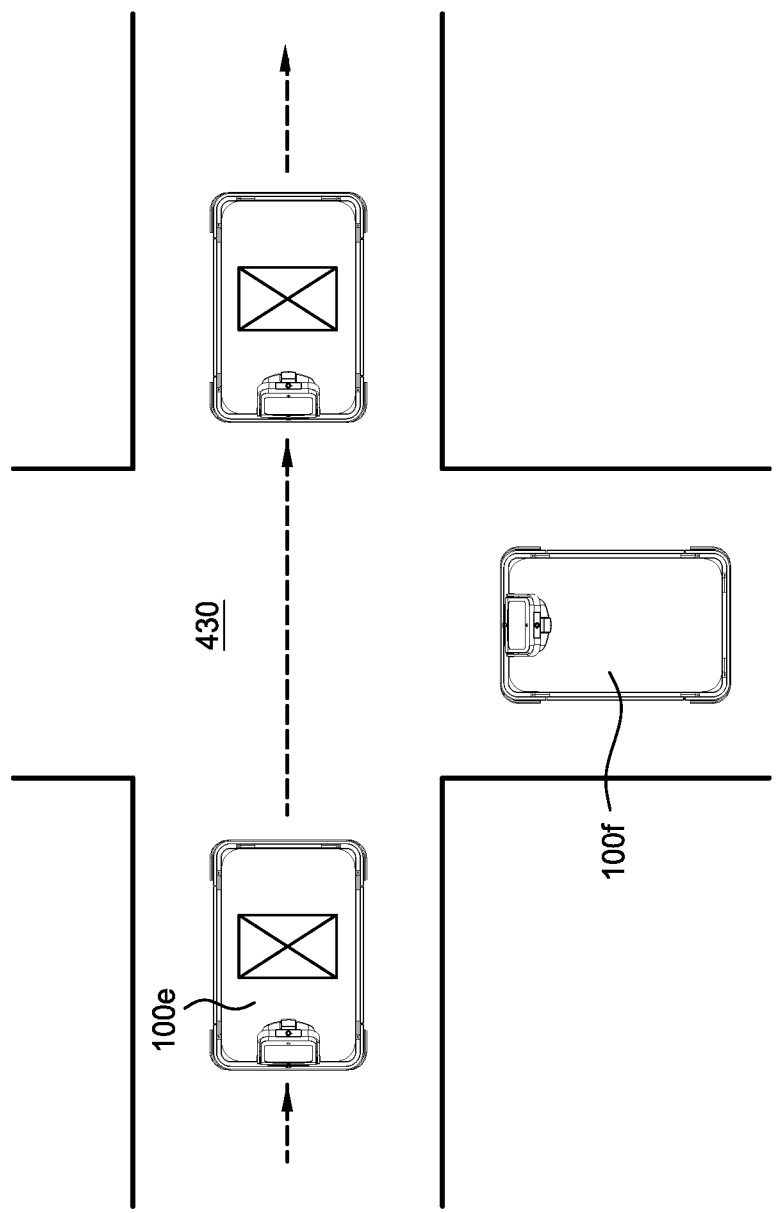

HUMAN INTERACTING AUTOMATIC GUIDED VEHICLE

BACKGROUND

Field

Embodiments disclosed herein relate to automatic guided vehicles that can interact with humans by leading people, following people, and receiving instructions from people.

Description of the Related Art

Robotic carts or Automatic Guided Vehicles (AGVs) are driverless, programmable controlled vehicles that can transport articles or inventory items from designated pickup area(s) to unloading area(s) within a facility. These vehicles may self-navigate in work environments, such as work environment guided by magnetic tapes, optical, or other suitable systems for route guidance and collision avoidance. AGVs can provide a safer environment for workers, inventory items, and equipment with precise and controlled movement. Workers are usually present in the work environment with the AGVs to help AGVs load, unload or move inventory items at designated areas. Therefore, there is a need for human interacting robotic carts.

SUMMARY

Embodiments of the present disclosure include automated guided vehicles (AGVs) that are capable of interacting with human operators and avoiding collisions during operation and methods for operating the AGVs.

One embodiment provides a self-driving system. The self-driving system comprises a mobile base comprising motorized wheels, wherein the mobile base has a first end and a second end, a console coupled to the first end of the mobile base in a standing configuration, wherein the console is configured to control the motorized wheels to move the mobile base forward and backward, the mobile base is moving forward when the first end is the leading end, and the mobile base is moving backward when the second end is the leading end, and a camera coupled to the console and configured to detect a human operator in motion and to allow the mobile base to follow the human operator.

Another embodiment provides a warehouse management system comprising a system controller, and a plurality of automatic guided vehicles (AGVs) connected to the system controller via a network, wherein at least one of the AGVs is configured to interact with human operators by following a human operator or leading a human operator.

Yet another embodiment provides a method for operating an automatic guided vehicle (AGV). The method comprises moving the AGV under a self-navigating/leading mode or a following mode, wherein the AGV moves along a pre-selected route under a self-navigating/leading mode, and the AGV moves behind a human operator within a line of sight of a camera on the AGV, and switching moving directions of the AGV when the operating mode is switched from the self-navigating/leading mode to the following mode, and when the operating mode is switched from the following mode to the self-navigating/leading mode.

BRIEF DESCRIPTION OF THE DRAWINGS

FIG. 6 is a schematic view of an AGV in a leading mode.

FIG. 13 is a schematic view of a warehouse passage showing a collision avoidance operation.

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the present disclosure include automated guided vehicles (AGVs) that are capable of interacting with human operators and avoiding collisions during operation. The AGV according to the present disclosure includes a console coupled to a mobile base. The mobile base is capable of moving under given instructions while carrying loads within a facility. The console and the mobile base use one or more sensors or cameras to enable docking, self-driving, and/or interaction with loads to be transferred, fixtures, and human operators in a facility. While the term AGV is used, the concept of this disclosure can be applied to any mobile robots, such as autonomously-navigating mobile robots, inertially-guided robots, remote-controlled mobile robots, and robots guided by laser targeting, vision systems, or roadmaps.

Figure 1:
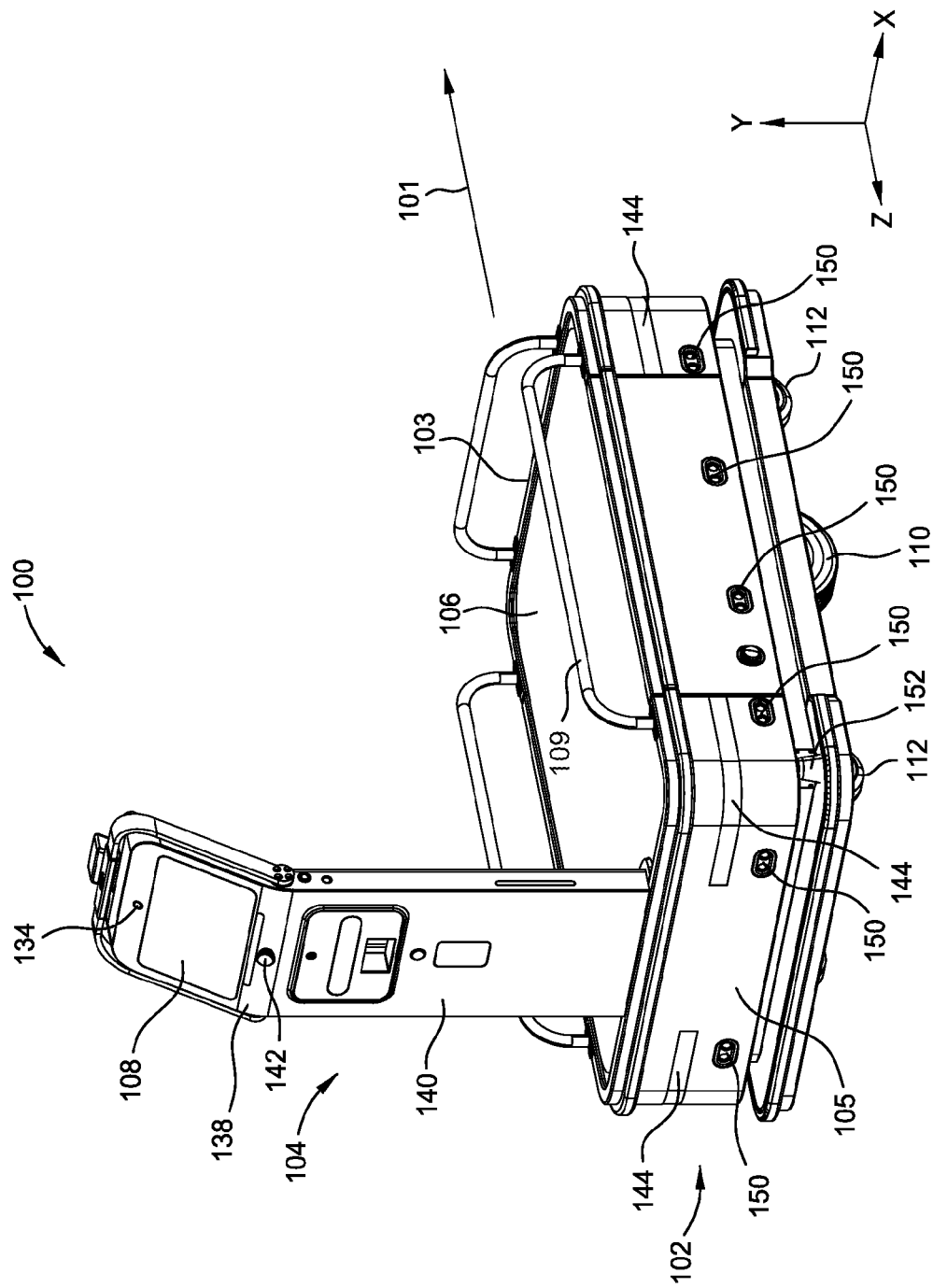
FIG. 1 is a perspective view of an automated guided vehicle (AGV according to one embodiment.
Figure 2:
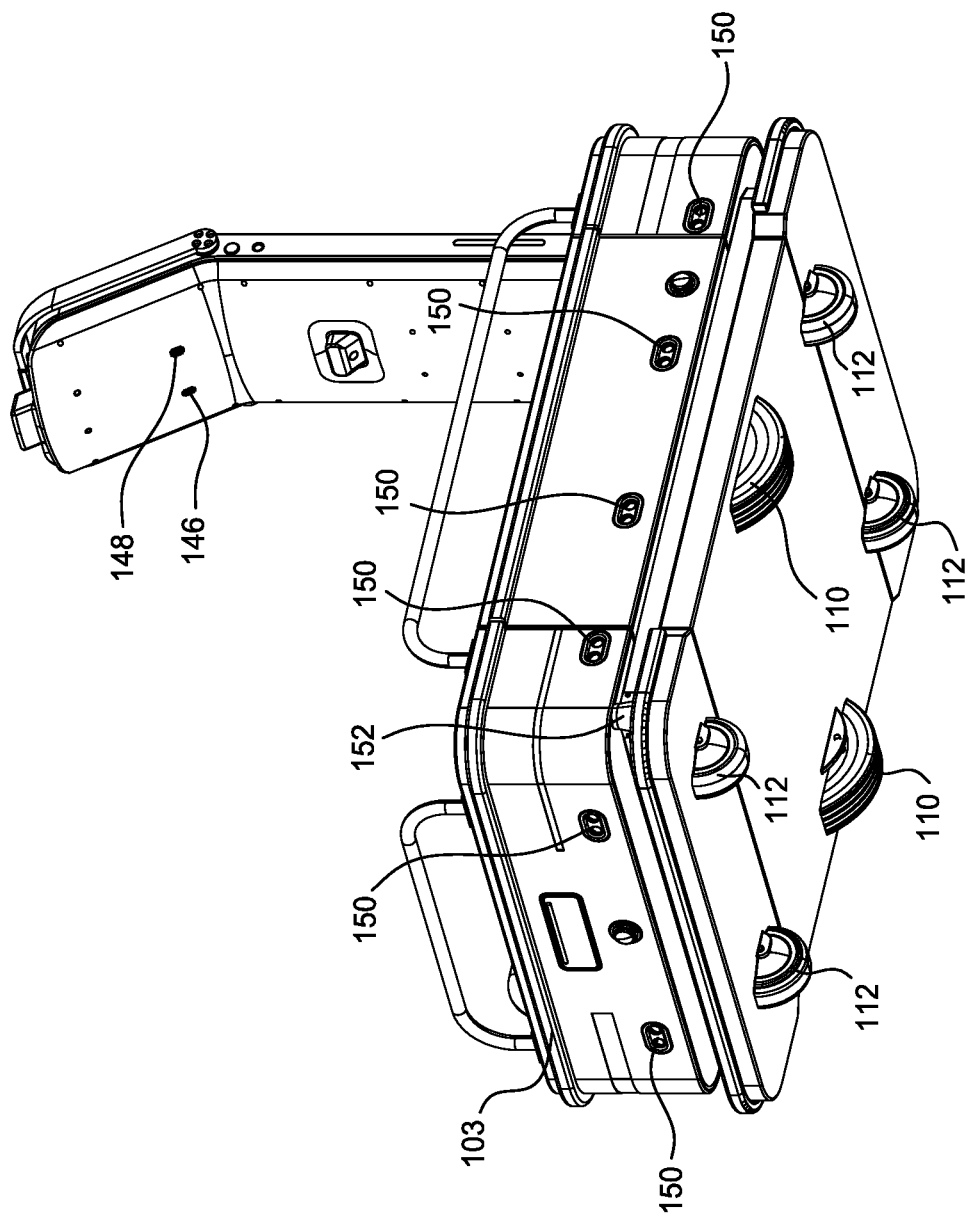
FIG. 2 is another perspective view of the AGV of FIG. 1.
Figure 3:
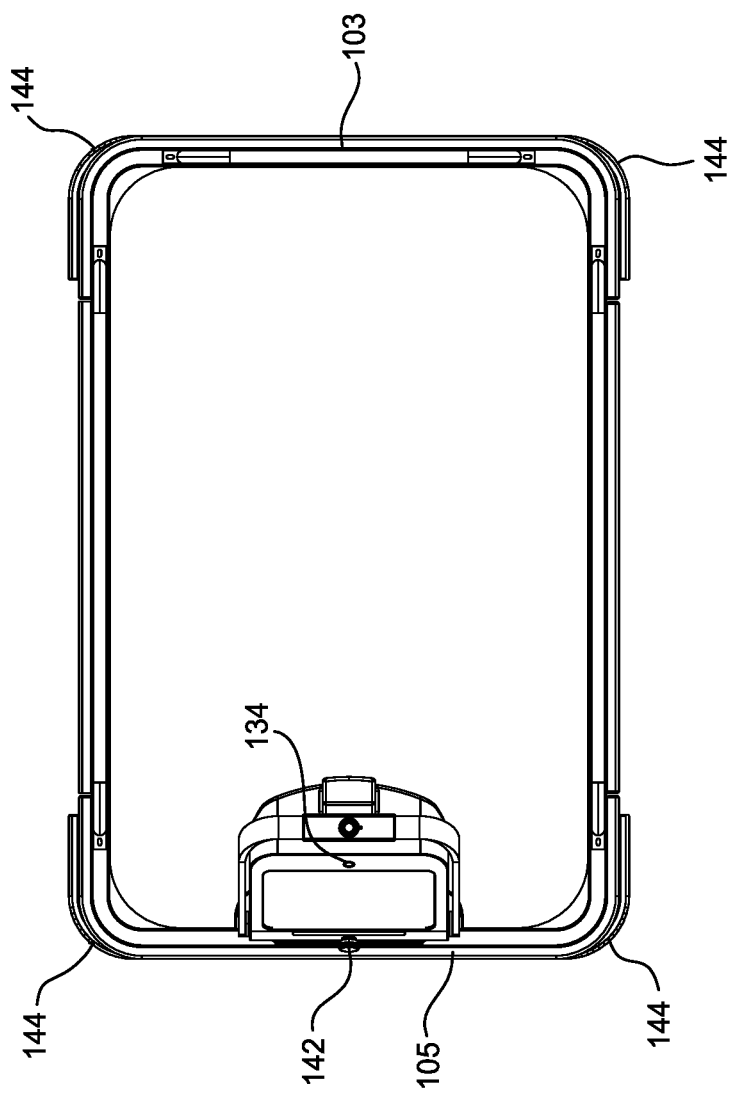
FIG. 3 is a top view of the AGV of FIG. 1.
Figure 5:
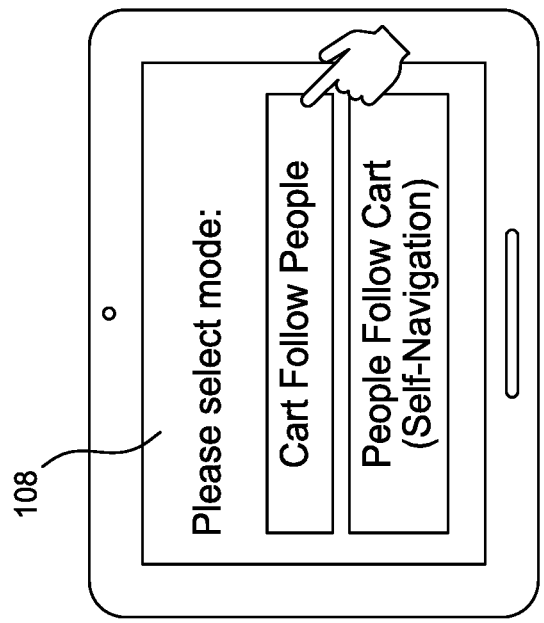
FIG. 5 is a view of a display screen of the console of FIG. 4.
Figure 4:
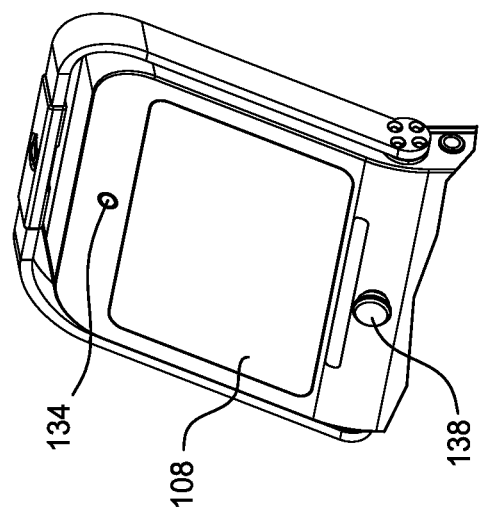
FIG. 4 is a partial view of the AGV of FIG. 1 showing a front view of a console.

FIGS. 1-5 illustrate an AGV according to one embodiment of the present disclosure. FIG. 1 is a perspective view of an automated guided vehicle (AGV) 100 according to one embodiment. FIG. 2 is another perspective view of the AGV 100. FIG. 3 is a top view of the AGV 100. FIG. 4 is a partial view of a console of the AGV 100. FIG. 5 is an exemplary display screen of the console of FIG. 4.

The AGV 100 is adapted to drive itself without an operator. The AGV 100 generally includes a mobile base 102 and a console 104. The mobile base 102 has a rear end 103 and a front end 105. The AGV 100 can either move forward or backward. In this disclosure, moving forward refers to the situation when the front end 105 is the leading end and moving backward refers to the situation when the rear end 103 is the leading end. The console 104 has an upper portion 138 and a main body 140. The main body 140 of the console 104 is coupled to the front end 105 of the mobile base 102 in a standing or upright configuration.

In some embodiments, the AGV 100 moves backwards, moving along a direction 101 with the rear end 103 as the leading end, to provide human operators with easy access to the console 104. The console 104 has a display 108. The display 108 may face outward or any orientation as needed. While the AGV 100 is moving backward along the direction 101 with the rear end 103 as the leading end, the display 108 is considered rear facing. Human operators can access the rear facing display 108 behind the AGV 100 thus avoiding colliding with the AGV 100. The display 108 can be any suitable devices for providing information associated with commands, map of the facility, routing information, inventory information, and inventory holder/inventory storage, etc. In some embodiments, the display 108 is a touch screen to receive input from human operators and allow human operators to control the operation of the AGV 100. If manual use of the AGV 100 is desired, the operator can override the automatic operation of the AGV 100 by entering updated commands via the display 108. FIG. 5 illustrates a screen shot of the display 108 where a human operator can select and set an operation mode for the AGV 100.

The AGV 100 further includes one or more cameras for capture images and/or videos of the surroundings of the AGV 100. In some embodiments, the AGV 100 includes a camera 134 disposed on the console 104 adjacent the display 108. The camera 134 may be attached to the console 104 to capture images and/or videos near the AGV 100. The camera 134 is configured to capture images of human operators for target recognition, such as face recognition, body recognition, and gesture recognition, in order to follow or lead the correct human operator. In some embodiments, the AGV 100 includes additional cameras configured to capture images and/or videos at other sides of the AGV 100. For example, the AGV 100 may include one or more cameras disposed on the console 104 on the opposite side of the display 108. As shown in FIG. 2, the AGV 100 includes two cameras 146, 148 positioned on the console 104. In some embodiments, the AGV 100 further includes one or more sensors configured to detect the presence of objects nearby and/or measure distances from the objects nearby. For example one or more sensors may be placed on the mobile base 102. The sensors may include any suitable sensors that can be configured to detect the presence of nearby objects, such as proximity sensors, sonar sensors, ultrasonic sensors, infrared sensors, radar sensors, LiDAR, and any combination thereof. As shown in FIG. 1, the AGV 100 includes a plurality of ultrasonic sensors 150 placed on sides of the mobile base 102. The AGV 100 may further include one or more LiDAR sensors 152 positioned on the mobile base 102, for example at corners of the mobile base 102. The LiDAR sensor 152 illuminates a target with pulsed laser light and measures the reflected pulses for the target to measure the distance to the target. Differences in laser return times and wavelengths can be used to make digital 3-D representations of the target. During operation, the ultrasonic sensors 150 and LiDAR sensors 152 are used for maintaining proper distance with human operators and obstacle to avoid collision.

During operation, the combination of the information recorded, detected, and/or measured by the sensors or cameras is used to help autonomously move the AGV 100 in a given direction while avoiding nearby obstacles, enable interaction with human operators by detecting and recognizing identity and instruction from human operators, detect and recognize fixtures and moving objects, and other suitable actions.

The AGV 100 further includes an emergency stop bottom 142 configured to enable manual stop of the AGV 100. In one embodiment, the emergency stop button 142 is positioned on the console 104. The emergency stop button 142 is outward facing to improve operation safety.

The mobile base 102 has a plurality of motorized wheels 110 and a plurality of stabilizing wheels 112. In one embodiment, the mobile base 102 has two motorized wheels 110 and four stabilizing wheels 112. The stabilizing wheels 112 may be caster-type wheels and positioned at four corners of the mobile base 102. The motorized wheels 110 may be located underneath the mobile base 102 between the front stabilizing wheels 112 and the rear stabilizing wheels 112. Each of the motorized wheels 110 is configured to rotate and roll in any given directions. For example, the motorized wheels 110 can rotate about the y-axis and roll back and forth on the ground about its axle spindle along any directions, such as along the x-axis or along the z-axis. The motorized wheels 110 may be controlled to roll at different speeds. If desired, any or all of the stabilizing wheels 112 may be motorized.

The mobile base 102 has an upper surface 106 that can be used to support loads, such as inventory packages in a warehouse. In some embodiments, the mobile base 102 includes one or more guard rails 109 raised from edges of the upper surface 106 to prevent loads from sliding off during operation.

The AGV 100 further includes signal lights 144 configured to indicate status of the AGV 100. Each signal light 144 is configured to indicate status of the AGV 100 by color and/or by flashing patterns. In one embodiment, the AGV 100 includes four signal lights 144 positioned at four corners of the mobile base 102. In some embodiments, the signal lights 144 are LED (light-emitting diode) lights. Each signal lights 144 may include multiple color LED lights for indicating multiple status of the AGV 100, as will be discussed in more detail below.

The AGV 100 according to the present disclosure is configured to interact with human operators and operate in multiple modes. Human operators can interact with the AGV 100 through multiple channels including using the user interface on the console 104, such as the display 108 and emergency stop button 142, using gestures when in the line of sight of the AGV 100, using mobile devices, or other suitable methods, such as using voice command. The AGV 100 may communicate with human operators using signal lights 144 and the display 108 to indicate current operating mode, status, and/or acknowledge recognition and acceptance of commands from human operators. The AGV 100 may operate in a self-navigating mode, a leading mode, a following mode, a waiting mode, and a stand-by mode. Operating modes may be selected by human operators interacting with the AGV 100 or instructed by a controller, such as a controller from a warehouse management system (WMS). In some embodiments, the AGV 100 is capable of interacting with the human operators in all or most of the operating modes.

Self-Navigating Mode

Under the self-navigating mode, the AGV 100 carries out an operation independently. The AGV 100 knows the destination and the task to be performed after arriving at the destination.

In some embodiments, the AGV 100 moves backwards under the self-navigating mode. Moving backwards allows human operators to interact with the touch screen of the display 108, the camera 134, the emergency stop button 144, or other user interface components on the console 104 behind the moving AGV 100 therefore avoiding collision with the AGV 100. Alternatively, the AGV 100 may move forwards under the self-navigating mode, e.g., moving with the front end 105 as the leading end, in suitable situations.

Leading Mode

Under the leading mode, the AGV 100 carries out an operation or a series of operations while leading one or more human operators. Similar to the self-navigating mode, the AGV 100 knows the destination and the task to be performed after arriving at the destination. In some embodiments, the AGV 100 moves backwards under the leading mode. If desired, the AGV 100 may move forwards under the leading mode. In some embodiments, the AGV 100 may adjust moving speed and/or wait for the human operator while operating under the leading mode.

FIG. 6 is a schematic view of the AGV 100 in the leading mode. The AGV 100 may switch to the leading mode upon receiving instruction from a system controller or from the user interface, such as from the console 104. Once the AGV 100 is switched to the leading mode, the AGV 100 use one or more cameras, such as the camera 134 on the console 104, to search and identify the human operator to lead, and then leads the human operator to the destination according to the task to be performed. In some embodiments, the human operator can be identified by facial features, bone structures, features on the clothing, or combinations thereof. If the AGV 100 was moving forward previously, for example under the following mode, the AGV 100 turns to move backward after switching to the leading mode.

In some embodiments, the AGV 100 is already associated with a task when switched to the leading mode. The AGV 100 may display the task information on the display 108 for the human operator to see and allows the human operator to decide whether to follow the AGV 100. If the human operator decides to follow the AGV 100, the human operator will allow the AGV 100 to proceed and follow the path of the AGV 100. As shown in FIG. 6, during the leading mode, the AGV 100 moves backwards with the display 108 and the camera 134 facing backward so that the human operator can see the content on the display 108 and the AGV 100 can keep the human operator at the line of sight. If the human operator decides not to follow the AGV 100 but rather head to the destination on his own, the human operator may operate the touch screen on the display 108 to switch the AGV 100 back to the self-navigating mode from the leading mode.

In some embodiments, the task to be performed by the AGV 100 in the leading mode is determined by the specialty of the human operator following the AGV 100. For example, different human operators may be associated with different tasks in an operation setting. Different operators lead to different tasks and/or routes for the AGV 100. After the AGV 100 captures an image of the human operator, the AGV 100 sends the image of the human operator to the WMS server. The WMS server identifies the human operator in the image, retrieves the task information associated with the human operator, then sends the task information to the AGV 100 and instructs the AGV 100 to perform the task. After receiving the task information, the AGV 100 may display the task information on the display 108 and lead the human operator to the destination associated with the task.

In some embodiments, as shown in FIG. 6, the AGV 100 moves backwards with the console 104 facing backwards under the leading mode. The backward facing console 104 provides easy access to the human operator following the AGV 100 to easily interact with the AGV 100 via the touch screen of the display 108, the camera 134, the emergency stop button 144, or other user interface components.

Following Mode

Under the following mode, the AGV 100 moves after a human operator. The AGV 100 moves forward under the following mode so that the camera 134 on the console 104 faces the human operator being followed. Moving forward allows the human operator being followed to have easy access to the display 108 and other user interface components on the console 104 during the following mode. The AGV 100 focuses on the human operator and adjusts the moving speed to maintain a pre-determined distance from the human operator.

Figure 7:
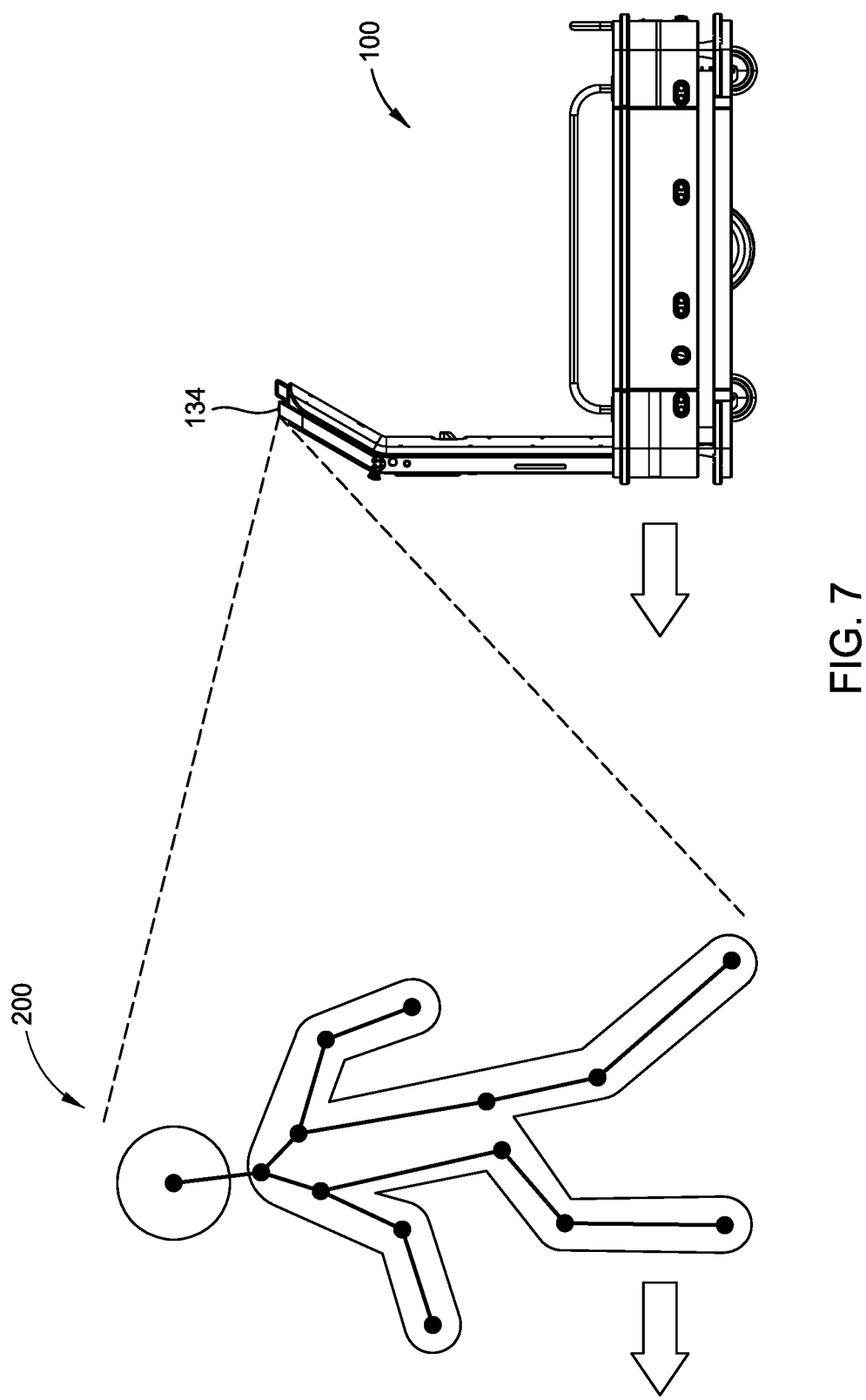
FIG. 7 is a schematic view of an AGV in a following mode.

FIG. 7 is a schematic view of the AGV 100 in the following mode. The AGV 100 may switch to the following mode upon receiving instruction from a system controller or from the user interface, such as the console 104. Once the AGV 100 is switched to the following mode, the AGV 100 uses one or more cameras, such as the front facing camera 134 on the console 104, to search and identify the human operator to follow, and then follows the human operator to the destination while moving forward. If the AGV 100 was moving backward previously, for example under the self-navigating mode or the leading mode, the AGV 100 turns to move forward after switching to the following mode. In some embodiments, the human operator can be identified by facial features, bone structures, features on the clothing, or combinations thereof.

Status Indication

According to embodiments of the present disclosure, the AGV 100 may use signal lights 144 to indicate current status to human operators and/or other AGVs in the environment. In one embodiment, the four signal lights 144 are synchronized in operation so that the status of the AGV 100 can be seen from different sides. In some embodiment, the signal lights 144 use different colors to indicate different status. For example, a first color indicates that the AGV 100 is performing an operation and heading to destination, a second color indicates that the AGV 100 has arrived at the destination and waiting to be loaded, and a third color indicates that the AGV 100 is waiting to be unloaded. When the signal lights 144 are single color lights, different flashing patterns may be used to indicate various status.

Gesture Control

In some embodiments, human operators can control the AGV 100 using gestures. For example, human operators can use a gesture to stop a moving AGV. The gesture control allows human operators to interact with the AGV when the touch screen or user interface components are not within the reach of the human operators.

Figure 8:
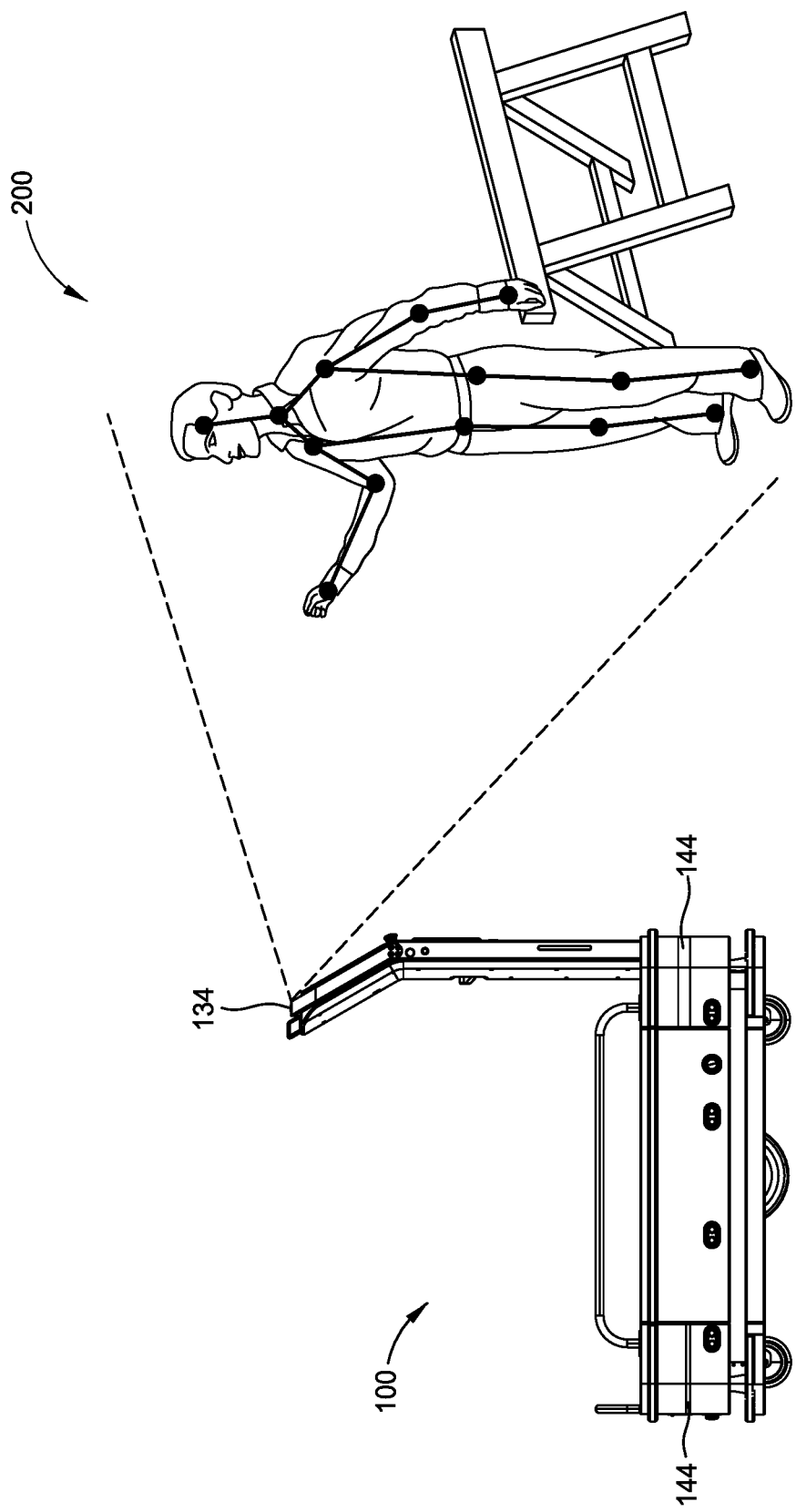
FIG. 8 is a schematic view of an AGV interacting with people.

FIG. 8 is a schematic view of a human operator interacts with an AGV via gesture. To control the AGV 100 via gestures, a human operator 200 needs to be within a line of sight of a camera on the AGV 100, such as the camera 134. Once the camera captures the human operator 200 and recognizes the gesture, the AGV 100 takes a suitable action. In some embodiments, the AGV 100 captures a full body image (or video) of a human operator, and analyzes relative positions of the limbs to abstract the gesture. In some embodiments, the AGV 100 provides an indicating signal once recognizing the gesture. For example, the AGV 100 may use signal lights to indicate a gesture is recognized and/or an action is taken. In FIG. 8, the human operator 200 is standing by an obstacle 202 that is in the way of the incoming AGV 100. The human operator 200 makes a gesture for the AGV 100 to stop. The camera 134 on the AGV 100 captures an image of the human operator 200 with the gesture and analyzes the image. After recognizing the gesture, the AGV 100 indicates the detection of the gesture, for example, with blinking signal lights 144. In some embodiments, the AGV 100 will stop to avoid collision with the obstacle 202 and the human operator 200. In other embodiments, the AGV 100 will take an obstacle avoidance action, such as re-route or take a detour. In some embodiments, the AGV 100 may send different signals and/or sound effects to let the human operator 200 know whether it will stop or take an avoidance action.

Figure 9:
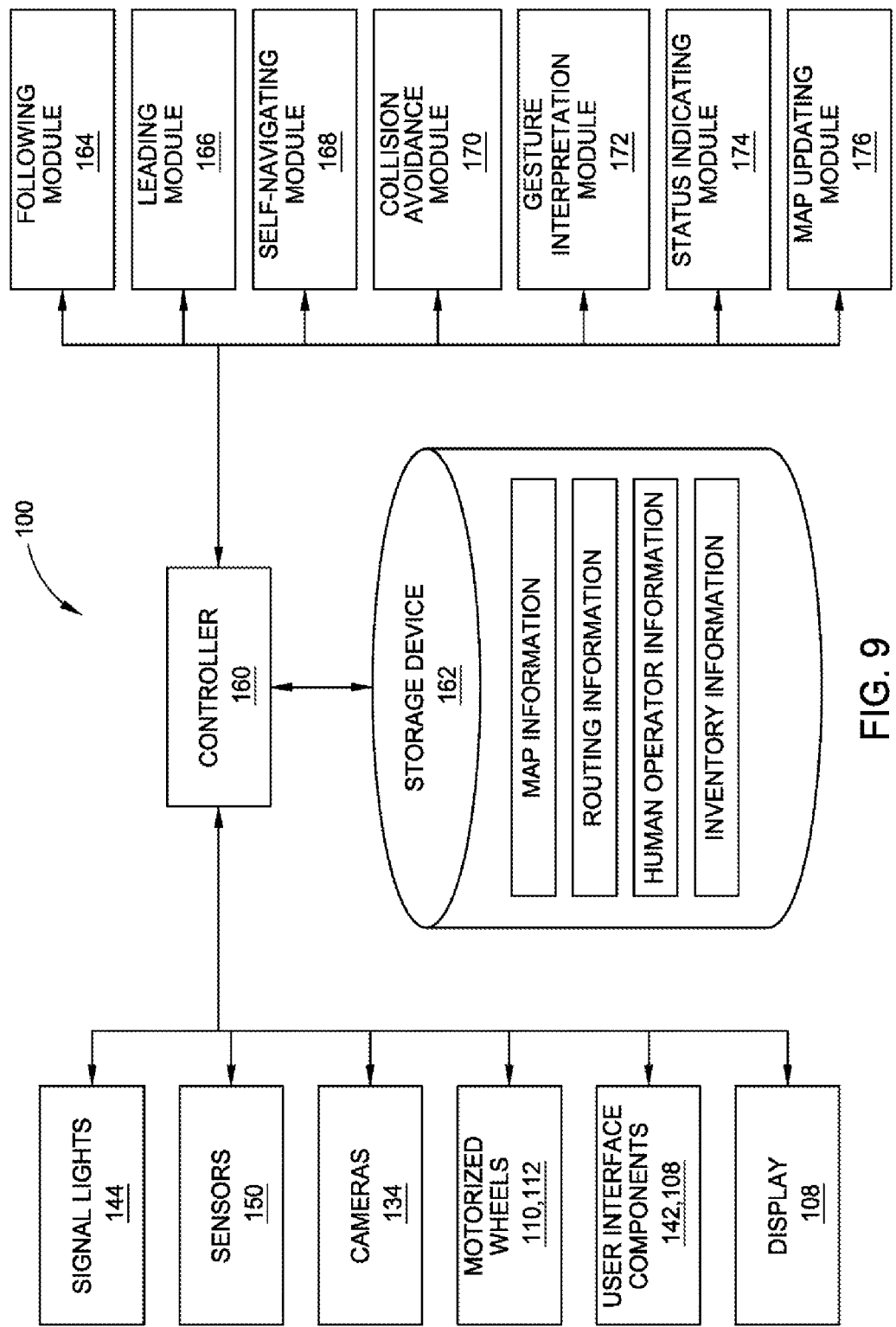
FIG. 9 is a plan view of an AGV according to the present disclosure.

FIG. 9 is an operating block diagram of the AGV 100 according to one embodiment. The AGV 100 includes a controller 160 configured to control operations of the AGV 100. The controller 160 is in communication with a storage device 162 containing data for performing operations, such as map information, routing information, human operator information, inventory information, and the likes. The controller 160 is also in communication with several modules configured to control the operations of the AGV 100. In some embodiments, the modules include a following module 164, a leading module 166, a self-navigating module 168, a collision avoidance module 170, a gesture interpretation module 172, a status indicating module 174, and a map updating module 176.

The controller 160, the modules, and/or the data contained on the storage device 162 are configured to control the wheels 110, 112, the signal lights 144, and/or the information displayed on the display 108, based at least in part on the information received from the proximity sensors, the camera 134, user input from the user interface components, and from a system controller, such as a controller for a warehouse management system. The controller 160 is configured to analyze the information received or retrieved from the cameras, the proximity sensors, the data on the storage device 162, and/or any of the modules and in response control the operation of the AGV 100, including the motorized wheels 110, 112, the signal lights 144, and/or the information displayed on the display 108.

Warehouse System

Figure 10:
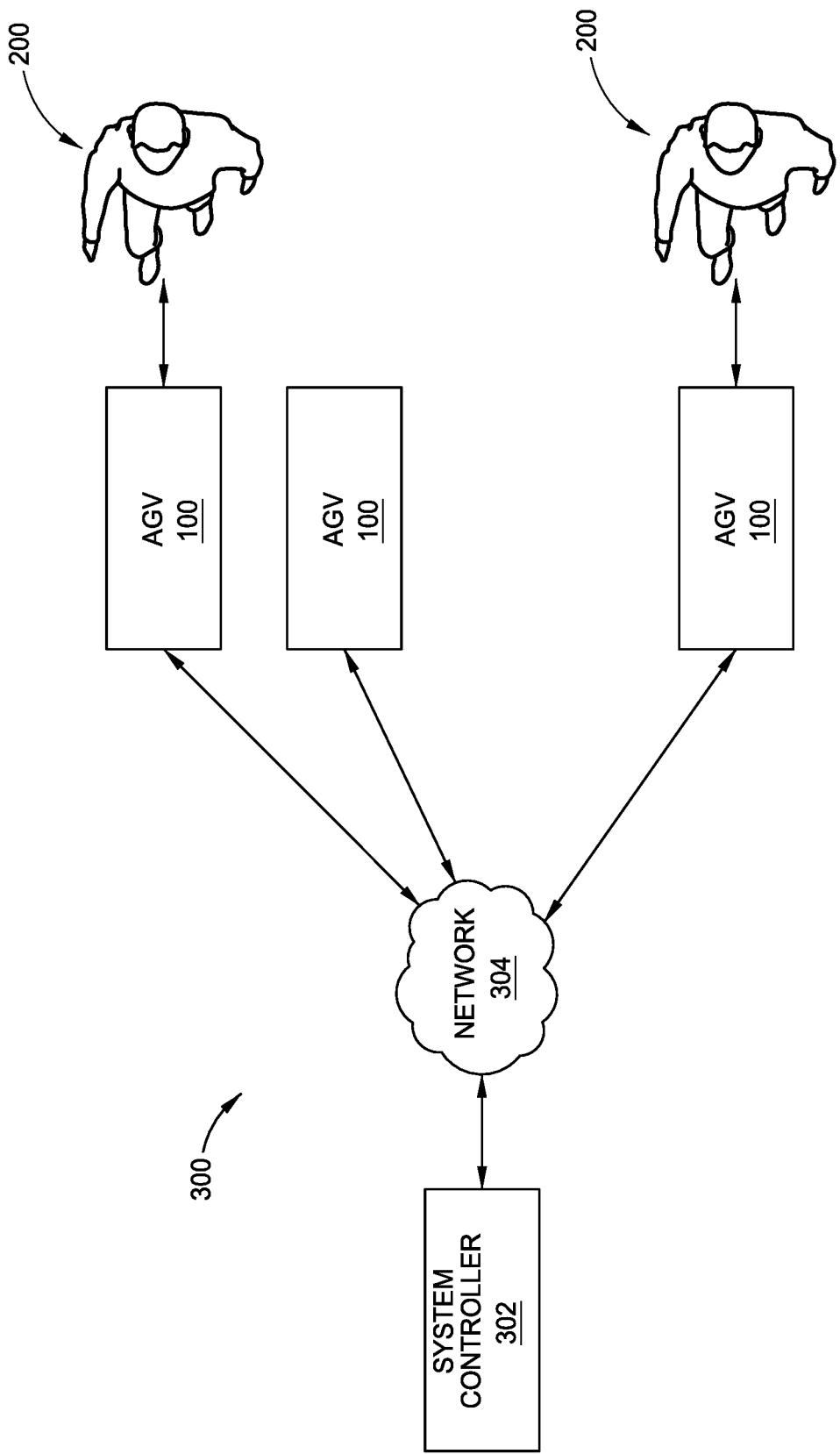
FIG. 10 is a plan view of a warehouse system according to the present disclosure.

The AGVs according to the present disclosure can be used as package carriers in various operating systems, such as warehouses, hospitals, airports, and other environments that may use automated package transportation. FIG. 10 is a plan view of a warehouse system 300 with a plurality of AGVs according to the present disclosure. The warehouse system 300 includes a system controller 302. The system controller 302 communicates with a plurality of AGVs 100 located in the warehouse via a network 304. The plurality of AGVs 100 may interact with human operators 200 in the warehouse. The system controller 302 sends instructions and information, such as operator information, inventory information, to the plurality of AGVs 100. The AGVs 100 sends captured images and sensor measurements to the system controller 302. The AGVs 100 and the human operators 200 interact directly or with the system controller 302 involved to perform various operations, such as leading human operators to a job site, following human operators to a job site, signaling human operators needs for loading/unloading, reacting to gestures from human operators, and avoiding collisions with other AGVs.

Figure 11:
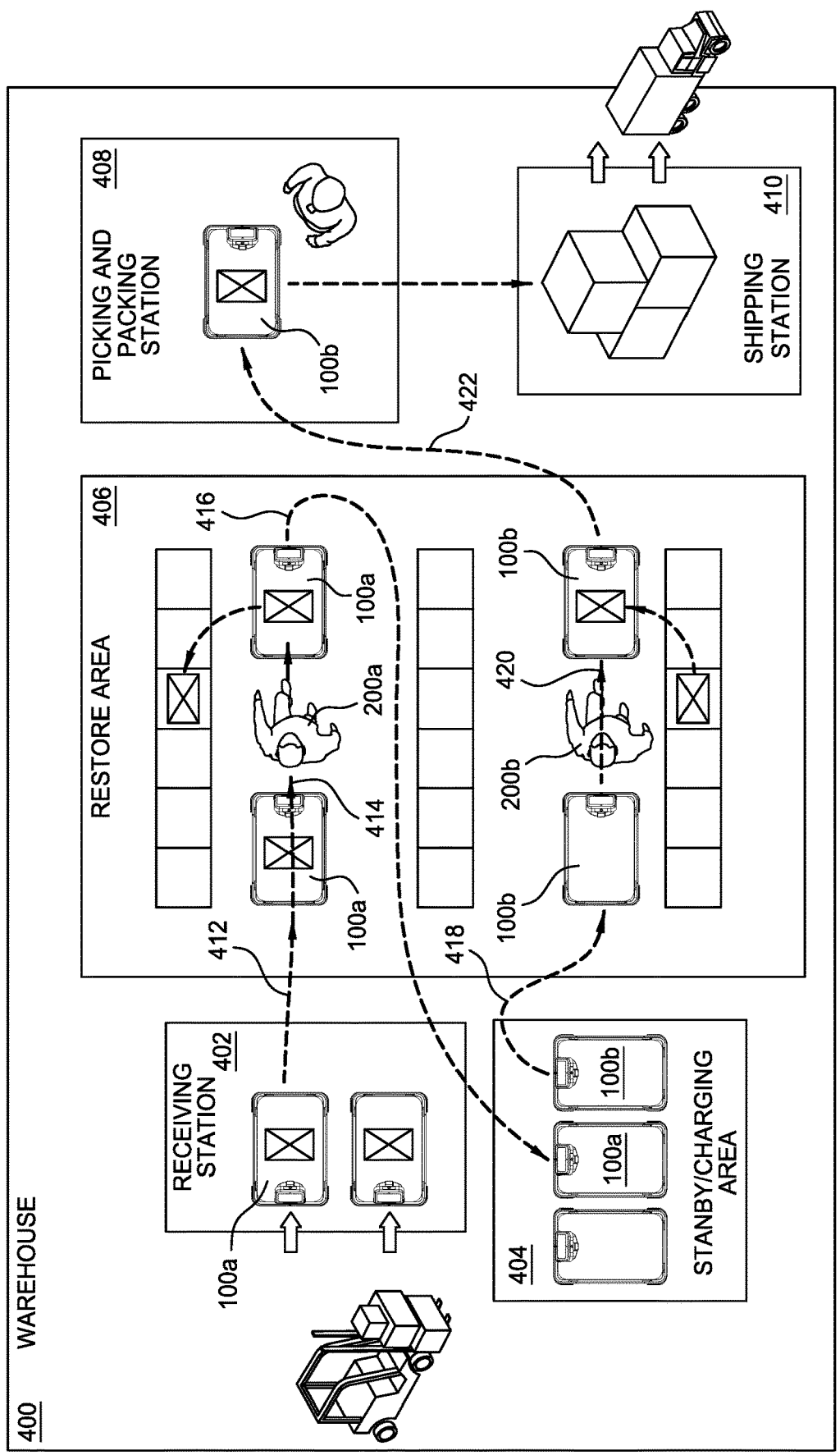
FIG. 11 is a view of a warehouse using AGVs for transporting packages.

FIG. 11 is a view of a warehouse 400 using AGVs for transporting packages. The warehouse 400 may include a receiving station 402, a standby/charging area 404, a restore area 406, a picking/packing station 408, and a shipping station 410. A plurality of AGVs and one or more human operators together transport and process packages work in the warehouse 400. FIG. 11 schematically demonstrates two exemplary tasks performed by AGV 100a and AGV 100b.

Warehouse Task Example 1

The AGV 100a is first loaded with packages at the receiving station 402. Upon the package loading is complete, the AGV 100a may receive instructions from a system controller, such as the system controller 302 in FIG. 10, to transport the packages to the restore area 406. In some embodiments, the AGV 100a transports the packages from the receiving station 402 to the restore area 406 through route 412 under the self-navigating mode. The route 412 may be chosen by the system controller or selected by the AGV 100a based on the map information in the storage device. In the self-navigating mode, the AGV 100a may move backwards, i.e. with the rear end 103 as the leading end. While on the route 412, the signal lights 144 of the AGV 100a send signals to indicate that the AGV 100a is under self-navigating mode and performing an operation.

When arriving at the restore area 406, the AGV 100a interacts with a human operator 200a. In some embodiments, the AGV 100a may stop upon arrival of the restore area 406 while the signal lights 144 indicate that the AGV 100a is waiting for unloading. The human operator 200a may come to the waiting AGV 100a to interact with the AGV 100a through the touch screen. In some embodiments, the human operator 200a may stop the AGV 100a using a gesture to further interact with the AGV 100a. The human operator 200a sets the AGV 100a to the following mode through the touch screen on the display 108. The AGV 100a uses the camera 134 to capture the image of the human operator 200a and abstract the characteristics of the human operator 200a, such as facial features and bone structures, for purpose of following the human operator 200a. To follow the human operator 200a, the AGV 100a turns around to move forward, with the front end 105 as the leading end, with the console 104 facing the human operator 200a. If desired, the AGV 100a may move backward while following the human operator 200a. While on the route 414, the signal lights 144 of the AGV 100a send signals to indicate that the AGV 100a is under the following mode and performing an operation.

The AGV 100a follows the human operator 200a along the route 414, unknown to the AGV 100a, to a location where the human operator 200a unloads the packages. In some embodiments, the AGV 100a and the human operator 200a may make two or more stops to unload all the packages.

After unloading the packages, the human operator 200a may set the AGV 100a to self-navigating mode. The AGV 100a turns around to move backwards to the standby/charging area 404 along a route 416. The route 416 may be chosen by a system controller or selected by the AGV 100a based on the map information in the storage device. While on the route 416, the signal lights 144 of the AGV 100a send signals to indicate that the AGV 100a is under self-navigating mode and without a load. The AGV 100a gets charged up and waits for further instructions from the system controller.

Alternatively, the route 414 may be performed under the leading mode. For example, upon interacting with the human operator 200a, the AGV 100a captures the image of the human operator 200a and sends the image to the system controller, such as the controller 302 in FIG. 10. The system controller identifies the human operator 200a based on the image according to information stored in the system, and sends a task instruction to the AGV 100a based on the role of the human operator 200a and the packages on the AGV 100a. The AGV 100a receives and displays the task information on the display 108. After seeing the task information on the display 108, the human operator 200a may decide whether to follow or to lead the AGV 100a. If the human operator 200a decides to follow the AGV 100a, the human operator 200a sets the AGV 100a to the leading mode. The AGV 100a selects the route 414 according to the task instruction and the stored map information, and leads the human operator 200a to the location for package unloading. While on the route 414, the signal lights 144 of the AGV 100a send signals to indicate that the AGV 100a is under the leading mode and with a load.

Warehouse Task Example 2

Upon receiving an instruction to go to the restore area 406, the AGV 100b waiting at the standby/charging station 404 travels from the standby/charging area 404 to the restore area 406 through route 418 under the self-navigating mode. In the self-navigating mode, the AGV 100b may move backwards, i.e. with the rear end 103 as the leading end. While on the route 418, the signal lights 144 of the AGV 100b send signals to indicate that the AGV 100b is under the self-navigating mode and without a load.

When arriving at the restore area 406, the AGV 100b interacts with a human operator 200b. In some embodiments, the AGV 100b may stop upon arrival of the restore area 406 while the signal lights 144 indicate that the AGV 100b is waiting for loading. The human operator 200b may come to the waiting AGV 100b to interact with the AGV 100b through the touch screen. In some embodiments, the human operator 200b may stop the AGV 100b using a gesture to further interact with the AGV 100b. The human operator 200a sets the AGV 100b to the following mode through the touch screen on the display 108. The AGV 100b uses the camera 134 to capture the image of the human operator 200b and abstract the characteristics of the human operator 200b, such as facial features and bone structures, for purpose of following the human operator 200b. To follow the human operator 200b, the AGV 100b turns around to move forward, with the front end 105 as the leading end, with the console 104 facing the human operator 200b. While on the route 420, the signal lights 144 of the AGV 100b send signals to indicate that the AGV 100b is under the following mode and without a load.

The AGV 100b follows the human operator 200b along the route 420, unknown to the AGV 100b, to a location where the human operator 200b loads packages on to the AGV 100b. In some embodiments, the AGV 100b and the human operator 200b may make two or more stops to load different packages.

After loading the packages, the human operator 200b may set the AGV 100b to self-navigating mode. The AGV 100b turns around to move backwards to the picking and packing station 408 along a route 422. The route 420 may be selected by the AGV 100b based on the map information in the storage device. While on the route 422, the signal lights 144 of the AGV 100b send signals to indicate that the AGV 100b is under self-navigating mode and performing a task. The AGV 100b gets unloaded at the picking and packing station 408, where the packages are processed and sent to the shipping station 410 to leave the warehouse 400.

Alternatively, the route 420 may be performed under the leading mode. For example, upon interacting with the human operator 200b, the AGV 100b captures the image of the human operator 200b and sends the image to the system controller, such as the controller 302 in FIG. 10. The system controller identifies the human operator 200b based on the image according to information stored in the system, and sends a task instruction to the AGV 100b based on the role of the human operator 200b. The AGV 100b receives and displays the task information on the display 108. After seeing the task information on the display 108, the human operator 200b may decide whether to follow or to lead the AGV 100b. If the human operator 200b decides to follow the AGV 100b, the human operator 200b sets the AGV 100b to the leading mode. The AGV 100b selects the route 420 according to the task instruction and the stored map information, and leads the human operator 200b to the location for package loading. While on the route 420, the signal lights 144 of the AGV 100b send signals to indicate that the AGV 100b is under the leading mode and without a load.

In warehouse environments, paths between shelfs are sometime narrow. Embodiments of the present disclosure further include mechanisms to prevent collisions between AGVs and/or between AGVs and human operators. According to one embodiment of the present disclosure, operations of the AGVs are designated with different levels of priority according to various factors, for example whether the AGV is moving along a known route, whether the AGV is carrying a load, the weight of the load, the speed of the AGV, the urgency of the task associated with the AGV, or other related factors. In some embodiments, the system controller, such as the controller 302 in FIG. 10, assigns each AGV with a priority level at all times based on the various factors associated with the AGV at the time. The system controller monitors real time locations of all the AGVs in motion and sends out instructions to stop AGVs with a lower priority when two AGVs about to cross each other. The various factors are used in combination and provided with different weight.

In one embodiment, an AGV with a load has a higher priority than an AGV without a load because it is easier and more efficient to stop an empty AGV than a loaded AGV. Additionally, a sharp break by a loaded AGV may cause the packages to drop off under inertia. In some embodiments, when two loaded AGVs cross each other, the AGV with a heavier load may have a higher priority than the AGV with a lighter weight.

In one embodiment, an AGV with a pre-select route, such as an AGV moving under the self-navigating mode or leading mode, has a higher priority than an AGV with an unknown route, such as an AGV under the following mode. This is because the movement of an AGV with an unknown route is unpredictable thus harder to avoid. When an AGV moving along a known route and an AGV moving along an unknown route, it is safer to stop the AGV with an unknown route to make sure a collision will not happen.

Collision Avoidance Example 1

Figure 12:
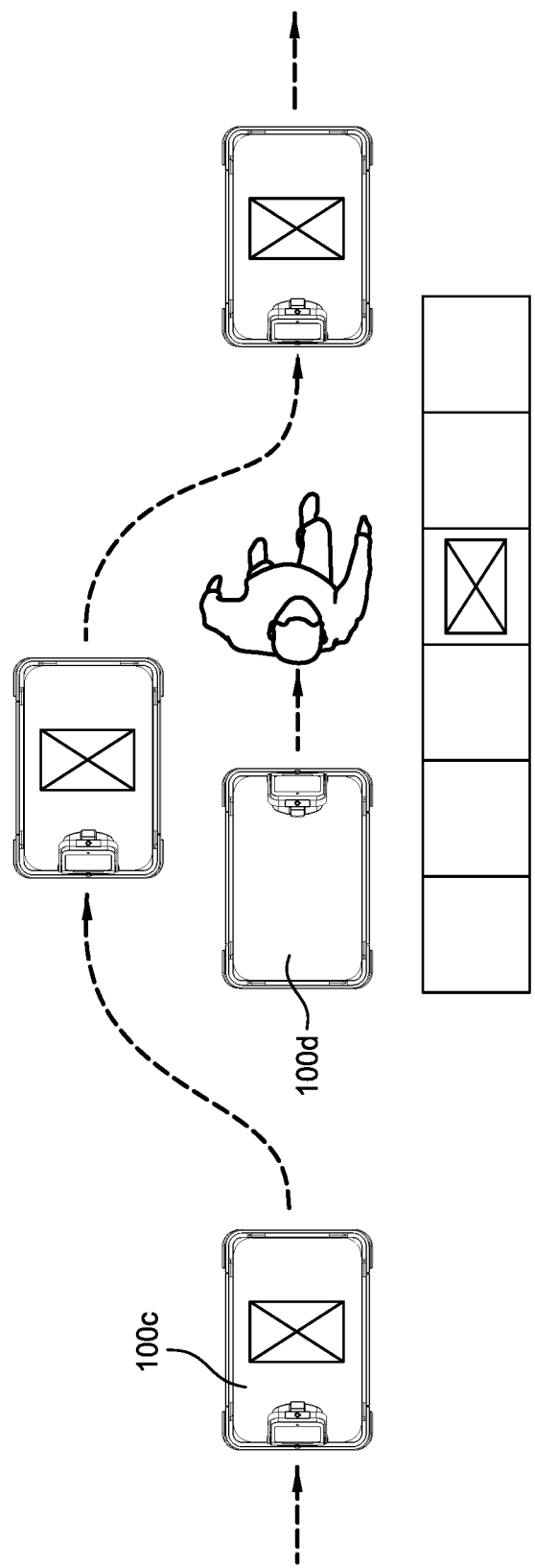
FIG. 12 is a schematic view of a warehouse passage showing a collision avoidance operation.

FIG. 12 is a schematic view of a warehouse passage showing a collision avoidance operation according to one embodiment of the present disclosure. An AGV 100c is moving under a self-navigating mode along a known route with a load of packages. An empty AGV 100d is moving behind a human operator under the following mode with an unknown route. The warehouse system controller assigns the AGV 100c with a higher priority than the AGV 100d because the presence of the load and the predictability of the route. When both the AGV 100c and AGV 100d come close at the same warehouse passage, the system controller sends an instruction to the AGV 100d to stop the AGV 100d. Under the self-navigating mode, the AGV 100c can avoid and pass the non-moving AGV 100d as if the AGV 100d is an obstacle. After the AGV 100c passes the AGV 100d, the system controller sends another instruction to the AGV 100d to resume its operation under the following mode.

Collision Avoidance Example 2

FIG. 13 is a schematic view of a warehouse passage showing a collision avoidance operation according to another embodiment of the present disclosure. An AGV 100e is moving under the self-navigating mode along a known route with a load of packages. An empty AGV 100f is moving under the self-navigating mode along a known route but without a load. The warehouse system controller assigns the AGV 100e with a higher priority than the AGV 100f because the presence of the load. When both the AGV 100e and AGV 100f come close at the same inter section 430, the system controller sends an instruction to the AGV 100f to stop the AGV 100f. The AGV 100e proceeds to pass the intersection 430. After the AGV 100e passes the intersection 430, the system controller sends another instruction to the AGV 100f to resume its operation. In some embodiments instructions may be pre-installed on to each AGV so that AGVs in a system can communicate with each other by peer-to-peer protocols without going through the system controller.

While the foregoing is directed to embodiments of the disclosure, other and further embodiments of the disclosure thus may be devised without departing from the basic scope thereof, and the scope thereof is determined by the claims that follow.

The invention claimed is:

1. A self-driving system, comprising:
    a mobile base comprising motorized wheels, wherein the mobile base has a first end and a second end;
    a console coupled to the first end of the mobile base in a standing configuration, wherein the console is configured to control the motorized wheels to move the mobile base forward and backward, the mobile base is moving forward when the first end is the leading end, and the mobile base is moving backward when the second end is the leading end;
    a camera coupled to the console and configured to detect a human operator in motion and to allow the mobile base to follow the human operator;
    a touch screen mounted on the console, wherein the touch screen and the camera are mounted on the same side of the console;
    a controller, wherein the controller is connected to the touch screen and the camera, and the controller is operable to send display information to the touch screen to allow the human operator to select an operating mode among a self-navigating mode, a following mode, and a leading mode,
    wherein mobile base is operable to move backward under the self-navigating mode or the leading mode, and the mobile base is operable to move forward under the following mode in which the mobile base follows the human operator, and
    wherein the controller is operable to instruct the mobile base to turn around from moving backward to moving forward when operating mode is switched from the self-navigating mode or the leading mode to the following mode.

2. The system of claim 1, wherein the controller is operable to receive images of the human operator from the camera, analyze the images to identify instructions in the form of gestures, and control the mobile base according to the identified instruction.

3. The system of claim 1, further comprising one or more signal lights configured to indicate operating status of the system.

4. The system of claim 1, further comprising an emergency stop button coupled to the console and configured to allow the human operator to manually stop the mobile base.

5. A method for operating an automatic guided vehicle (AGV), comprising:
    moving the AGV under a self-navigating/leading mode or a following mode, wherein the AGV moves along a pre-selected route under a self-navigating/leading mode, and the AGV moves behind a human operator within a line of sight of a camera on the AGV under the following mode;
    switching moving directions of the AGV so that the AGV turns around from moving backward to moving forward when the operating mode is switched from the self-navigating/leading mode to the following mode, and that the AGV turns around from moving forward to moving backward when the operating mode is switched from the following mode to the self-navigating/leading mode; and
    displaying on a touch screen of the AGV choices of operating modes to allow the human operator to select an operating mode, wherein the touch screen and the camera face the same direction, wherein the AGV moves backward with the touch screen at a rear end of the AGV and facing backwards under the self-navigating mode/leading mode, and the AGV moves forward with the touch screen at a head end of the AGV and facing forward under the following mode.

6. The method of claim 5, further comprising:
    capturing an image of the human operator with the camera;
    sending the image to a system controller via a network to obtain task information; and
    displaying the task information on the touch screen.

7. The method of claim 5, further comprising:
    indicating a current operating status of the AGV using signal lights on the AGV.

8. The method of claim 7, wherein indicating the current operating status comprising using different colors or flashing patterns to indicate different operating status.

9. The method of claim 5, further comprising:
    monitoring images from the camera to identify gestures from human operators; and
    reacting to the identified gestures.

10. The method of claim 5, further comprising:
    assigning a priority level of to the AGV according to an operating mode and a task being performed by the AGV; and
    yielding to an AGV with a higher priority level.

11. The method of claim 10, wherein the priority level is assigned based on whether the AGV is moving along a known route, whether the AGV is carrying a load, the weight of the load, the speed of the AGV, the urgency of the task associated with the AGV, or a combination thereof.

12. The method of claim 5, further comprising:
    controlling an action of the AGV using gestures by human operators; and
    changing a status of signal lights on the AGV when the gestures from the human operators are recognized.

* * * * *